US012152759B2

(12) United States Patent
Herz et al.

(10) Patent No.: US 12,152,759 B2
(45) Date of Patent: Nov. 26, 2024

(54) REINFORCED VISOR FOR A LUMINAIRE

(71) Applicant: Musco Corporation, Oskaloosa, IA (US)

(72) Inventors: Nathan E. Herz, Minneapolis, MN (US); Luke C. McKee, Oskaloosa, IA (US); Philip D. Hol, New Sharon, IA (US)

( * ) Notice: Subject to any disclaimer, the term of this patent is extended or adjusted under 35 U.S.C. 154(b) by 0 days.

(21) Appl. No.: 18/161,381

(22) Filed: Jan. 30, 2023

(65) Prior Publication Data

US 2024/0255122 A1 Aug. 1, 2024

(51) Int. Cl.
*F21V 17/04* (2006.01)

(52) U.S. Cl.
CPC .................................... *F21V 17/04* (2013.01)

(58) Field of Classification Search
CPC .................................... F21V 17/04; F21V 1/04
See application file for complete search history.

(56) References Cited

U.S. PATENT DOCUMENTS

| | | | | |
|---|---|---|---|---|
| 5,347,432 | A * | 9/1994 | Chiavetta | F21V 11/18 362/18 |
| 10,267,495 | B1 * | 4/2019 | Boiragi | F21V 17/16 |
| 10,378,732 | B2 | 8/2019 | Gordin et al. | |
| D934,477 | S | 10/2021 | Gordin et al. | |
| D936,264 | S | 11/2021 | Gordin et al. | |
| 2018/0347787 | A1 * | 12/2018 | Gordin | F21V 14/04 |
| 2022/0010944 | A1 | 1/2022 | Gordin et al. | |

FOREIGN PATENT DOCUMENTS

| | | | |
|---|---|---|---|
| CN | 209415111 | 9/2019 | |
| KR | 101649184 B1 * | 11/2015 | F21V 17/10 |
| WO | 2006-078832 | 7/2006 | |

* cited by examiner

*Primary Examiner* — Julie A Bannan
(74) *Attorney, Agent, or Firm* — Kurt J. Fugman; Zachary S. Pratt

(57) ABSTRACT

A reinforced visor for use with a luminaire includes an exterior shell, a first interior end rib bracket, and a first exterior reinforcement member. The exterior shell extends an overhang distance measured from the first interior rib bracket to a free end of the exterior shell, and the first exterior reinforcement member is attached to the first interior rib member with the exterior shell interposed between the first exterior reinforcement member and the first interior end rib bracket.

14 Claims, 20 Drawing Sheets

REINFORCED VISOR FOR A LUMINAIRE

TECHNICAL FIELD

The disclosure generally relates to visors that are used to reduce glare and spill over light from LED luminaires or the like. More specifically, the disclosure teaches a reinforced visor for such luminaires that is more robust and less prone to wind damage or the like.

BACKGROUND

Sports fields, and racetracks, etc. commonly use lights such as LED (light emitting diodes) luminaires to provide lighting for nighttime sport activity such as races. It is undesirable if glare from the light source of the luminaire cause the drivers to be distracted.

For example, as shown in FIG. 1, visors 50 and/or light directing means 52 (mirrors or other reflectors) may be employed to avoid direct glare from the light sources 54 distracting the drivers. However, windy conditions may cause the visors to deteriorate, necessitating their replacement. If the timing of the damage is inopportune, a visor could come loose during a race.

Accordingly, it is desirable to provide a visor that is more robust than has heretofore been devised.

SUMMARY

A reinforced visor for use with a luminaire according to an embodiment of the present disclosure may comprise a reinforcement system including a first rib bracket with a first m-shape or with a first n-shape, a second rib bracket with a second m-shape or a second n-shape that is spaced away from the first rib bracket a first predetermined distance, and a first reinforcement member that is attached to the first rib bracket.

A reinforced visor for use with a luminaire according to another embodiment of the present disclosure may comprise a reinforcement system including a first rib bracket with a first n-shape, a second rib bracket with a second rib bracket with a j-shape that is spaced away from the first rib bracket a first predetermined distance, and a first reinforcement member that is attached to the first rib bracket.

A reinforced visor for use with a luminaire according to yet another embodiment of the present disclosure may comprise an exterior shell, a first interior end rib bracket, and at least a first exterior reinforcement member. The exterior shell may extend an overhang distance measured from the first interior rib bracket to a free end of the exterior shell, and the at least first exterior reinforcement member may be attached to the first interior rib member with the exterior shell interposed between the at least first exterior reinforcement member and the first interior end rib bracket.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

The following drawings are illustrative of particular examples of the present disclosure and therefore do not limit the scope of the disclosure. The drawings are not necessarily to scale, though examples can include the scale illustrated, and are intended for use in conjunction with the explanations in the following detailed description wherein like reference characters denote like elements. Examples of the present disclosure will hereinafter be described in conjunction with the appended drawings.

FIG. 10 is a sectional view of the double wide reinforced visor of FIG. 2, revealing the interior cavity formed by the outer panel and the inner panels. The interior cavity may be filled with a core material such as foam or the like.

DETAILED DESCRIPTION

Figure 1:
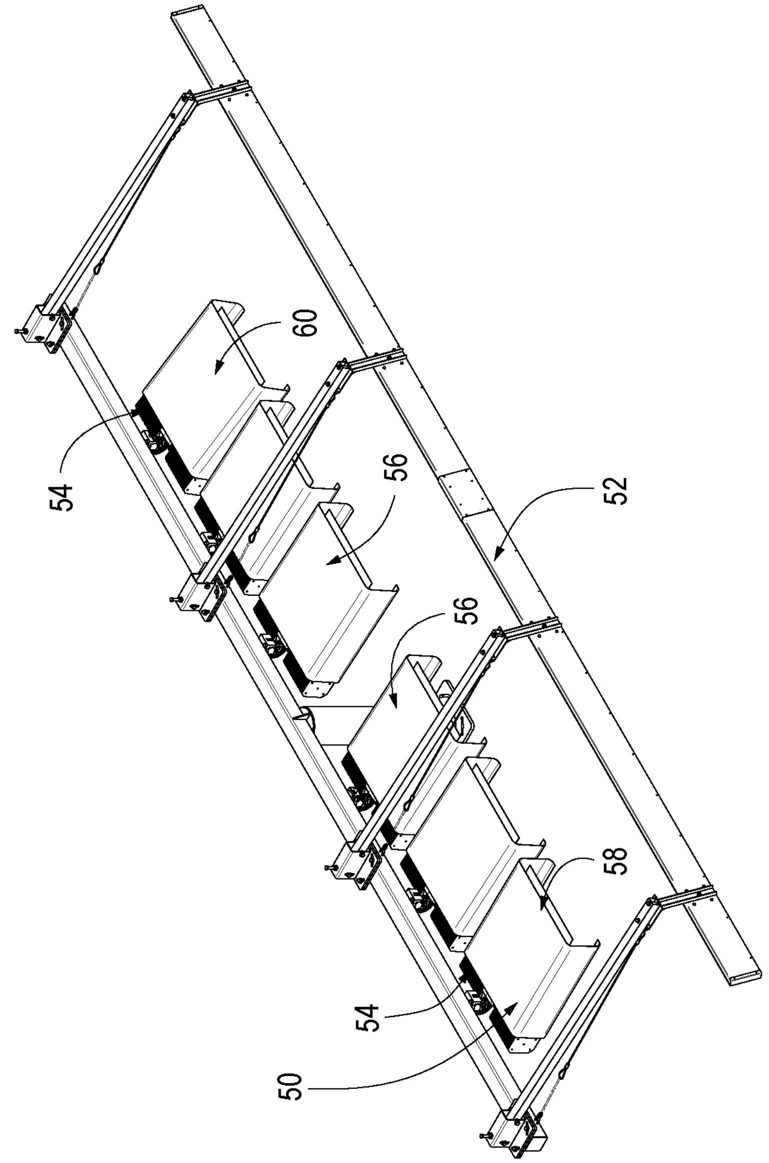
FIG. 1 (PRIOR ART)
FIG. 1 illustrates a prior art lighting system using visors on LED luminaires or fixtures that lack reinforcement.

The following detailed description is exemplary in nature and is not intended to limit the scope, applicability, or configuration of the techniques or systems described herein in any way. Rather, the following description provides some practical illustrations for implementing examples of the techniques or systems described herein. Those skilled in the art will recognize that many of the noted examples have a variety of suitable alternatives.

To further an understanding of the present disclosure, specific exemplary embodiments according to the present disclosure will be described in detail. Frequent mention will be made in this description to the drawings. Reference numbers will be used to indicate certain parts in the drawings. Unless otherwise stated, the same reference numbers will be used to indicate the same parts throughout the drawings. Further, similar reference numbers (e.g., 702, 802, 902, 1002, 1102) will be used to indicate similar parts or functionality between embodiments. Reference numbers followed by letters (e.g., 100, 100*a*) may denote the same or similar features that may be symmetrical to each other, etc.

Regarding terminology, terms such as “means”, “devices”, “elements”, “parts”, “portions”, “structure”, “components”, and “members” may be used interchangeably herein, in the singular or plural, by way of convenience and not depart from aspects of the present disclosure, nor place limiting effects on aspects of the present disclosure unless explicitly stated otherwise.

Also, terms such as “having”, “including”, “with”, etc. or forms thereof are to be interpreted as being open, not limiting the parts of a structure that may be added to that structure. The term “generally linear”, “linear array” or forms thereof are to be interpreted to include arrays of items that form a straight line within manufacturing tolerances (+/−0.020 of an inch).

Starting with FIGS. 2 thru 5, a reinforced visor 100, 200 for use with a luminaire or its fixture (e.g., see 54 in FIG. 1) will be described. It should be noted that visors 100, and 200 may be used in the middle instances 56 as shown in FIG. 1, but not necessarily so. Visor 100 may be referred to as a double wide visor, while visor 200 may be referred to as single wide visor since visor 100 since it is essentially the same as visor 200 but doubled in width with two light directing channels instead of one.

These visors 100, 200 may comprise a reinforcement system 102, 202 (best seen in FIGS. 11 thru 14) including a first rib bracket 104 with a first m-shape or with a first n-shape (see first rib bracket 204), and a second rib bracket 106 with a second m-shape or a second n-shape (see second rib bracket 206) that is spaced away from the first rib bracket 104, 204 a first predetermined distance 108, 208. The first predetermined distance may range from 16.5 inches to 17.5 inches and may be the same for both visors 100, 200 but not necessarily so. Also, the shapes of these rib brackets may be referred to as an “E” for visor 100 on its side, or a “C” on its side for visor 200, etc.

The distance between the ribs may be determined based on optical needs of different materials on the inside of the visor. In some embodiments, the reinforcement parts (e.g., 110, 112, & 114 etc.) may only need to be attach between the heatsink plate of the fixture and the first rib (104) as shown with the top plate. The side plates may be extended to make the part large enough to add a logo or the like, but not necessarily so.

A first reinforcement member that may be attached to the first rib bracket 104, 204 via fastening (e.g., using rivets, screws, etc.) or the like may take various forms such as a first side plate 110 that is also attached to the second rib member 106, 206, or a top plate 112, 212 that is only attached to the first rib bracket 104, 204, but not necessarily so. In many embodiments, the reinforcement system 102, 202 may further include a second side plate 114 that is attached to the first rib bracket 104, 204 and the second rib bracket 206. As a result of this construction, the first side plate 110, and the second side plate 114 may form a first pair of parallel sides of a reinforcement frame 116, 216 (may also be referred to as a box), while the first rib bracket 104, 204, and the second rib bracket 106, 206 define a second pair of parallel sides of the reinforcement frame 116, 216.

Also, the first rib bracket 104, 204 may comprise a first top outer flange 118, 218, a first side outer flange 120, 220, and a second side outer flange 122, 222 that extend from a first outer perimeter 124, 224 of the first m-shape or the first n-shape along a first same perpendicular direction 125, 225 to the first outer perimeter 124, 224.

It should be noted that the second rib bracket may be essentially constructed the same as the first rib bracket, being rotated 180 degrees to face the first rib bracket. Accordingly, the second rib bracket 106, 206 may comprise a second top outer flange 126, 226, a third side outer flange 128, 228, and a fourth side outer flange 130, 230 that extend from a second outer perimeter 132, 232 of the second m-shape or the second n-shape along a second same perpendicular direction 134, 234 to the second outer perimeter 132, 232 of the second rib bracket 106, 206. This second same perpendicular direction may be parallel to the first same perpendicular direction, but not necessarily so. The first side plate 110 (see also FIG. 18) may be attached to the first side outer flange 120, 220, and the third side outer flange 128, 228 while the second side plate 114 (see also FIG. 19) may be attached to the second side outer flange 122, 222, and the fourth side outer flange 130, 230. These attachments may be accomplished via fastening, etc. The side plates may have a trademark, logo, or other information on it, but not necessarily so.

As alluded to earlier herein with reference to FIGS. 11 thru 14, the first reinforcement member may take the form of a top plate 112, 212 (see also FIGS. 20 and 21) that may be attached to the first top outer flange 118, 218 of the first rib bracket 104, 204. The top plate 112, 212 may have a trapezoidal shape with a short side 136, 236, and a long side 138, 238. A first plurality of apertures 140, 240 may form a first linear array adjacent the short side 136, 236, whereas a second plurality of apertures 142, 242 may form a second linear array adjacent the long side 138, 238.

Figure 20:
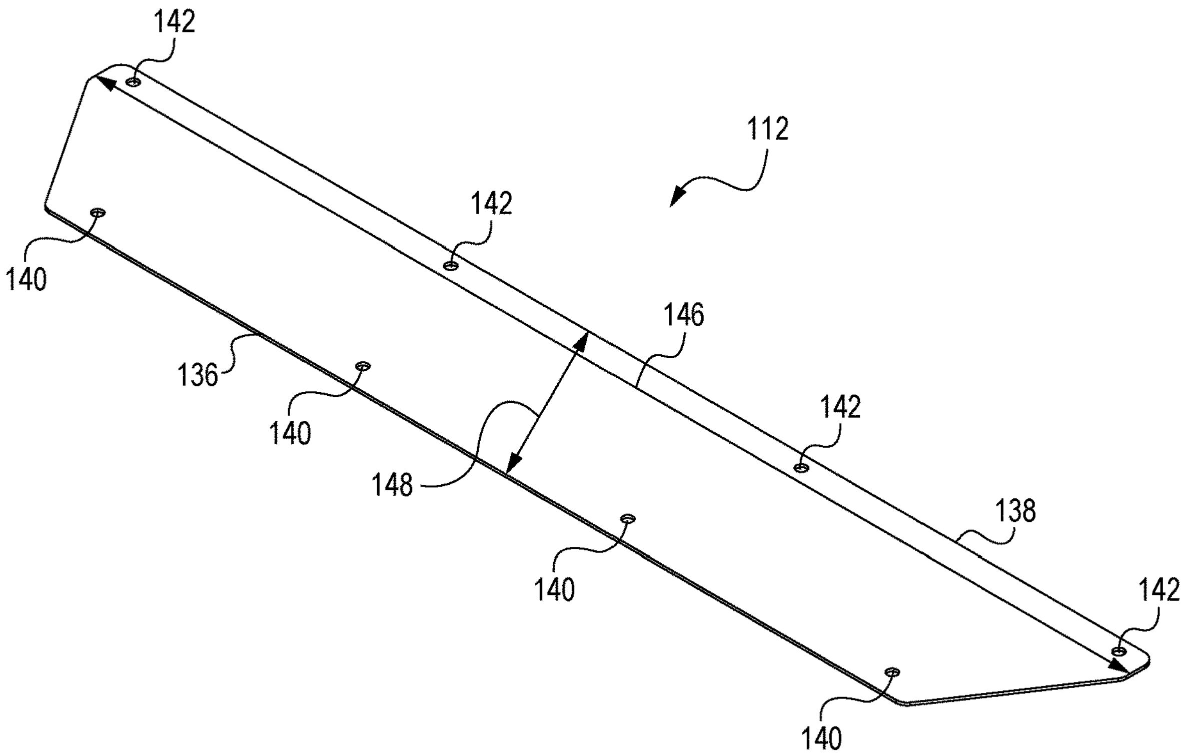
FIG. 20 depicts the top reinforcement plate shown in FIGS. 2 and 3, etc.
Figure 21:
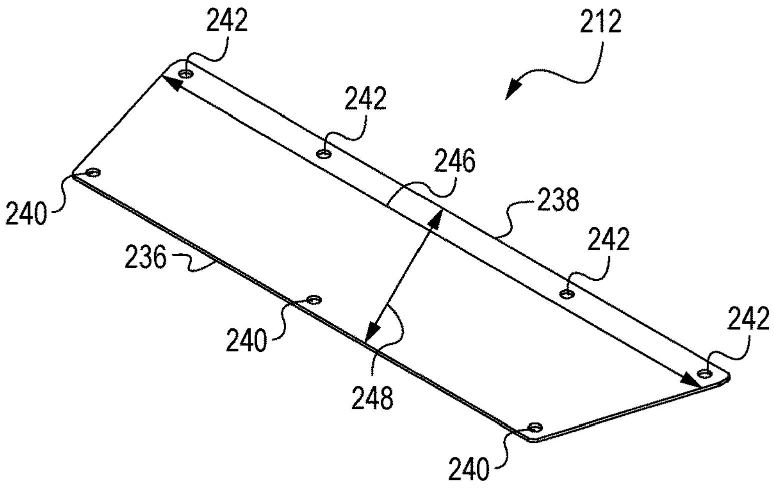
FIG. 21 contains the top reinforcement plate shown in FIGS. 4 thru 9, etc.

More specifically, the first plurality of apertures includes three or four apertures with fasteners 144 (see FIGS. 11 and 14) disposed therein (attaching the top plate to the first rib bracket), while the second plurality of apertures includes four empty holes (for attaching the visor later to a fixture or luminaire). Other types of arrays and number of apertures may be employed in other embodiments of the present disclosure. In FIGS. 20 and 21, the top plate 112, 212 defines an overall length 146, 246, and an overall width 148, 248. A ratio of the overall length to the overall width ranges from 5.15 to 7.4 in FIG. 20, while this ratio ranges from 2.95 to 4.25 in FIG. 21. It should be noted that these ratios may be different and that the top plate may be rectangular instead of trapezoidal in other embodiments of the present disclosure, etc.

Figure 11:
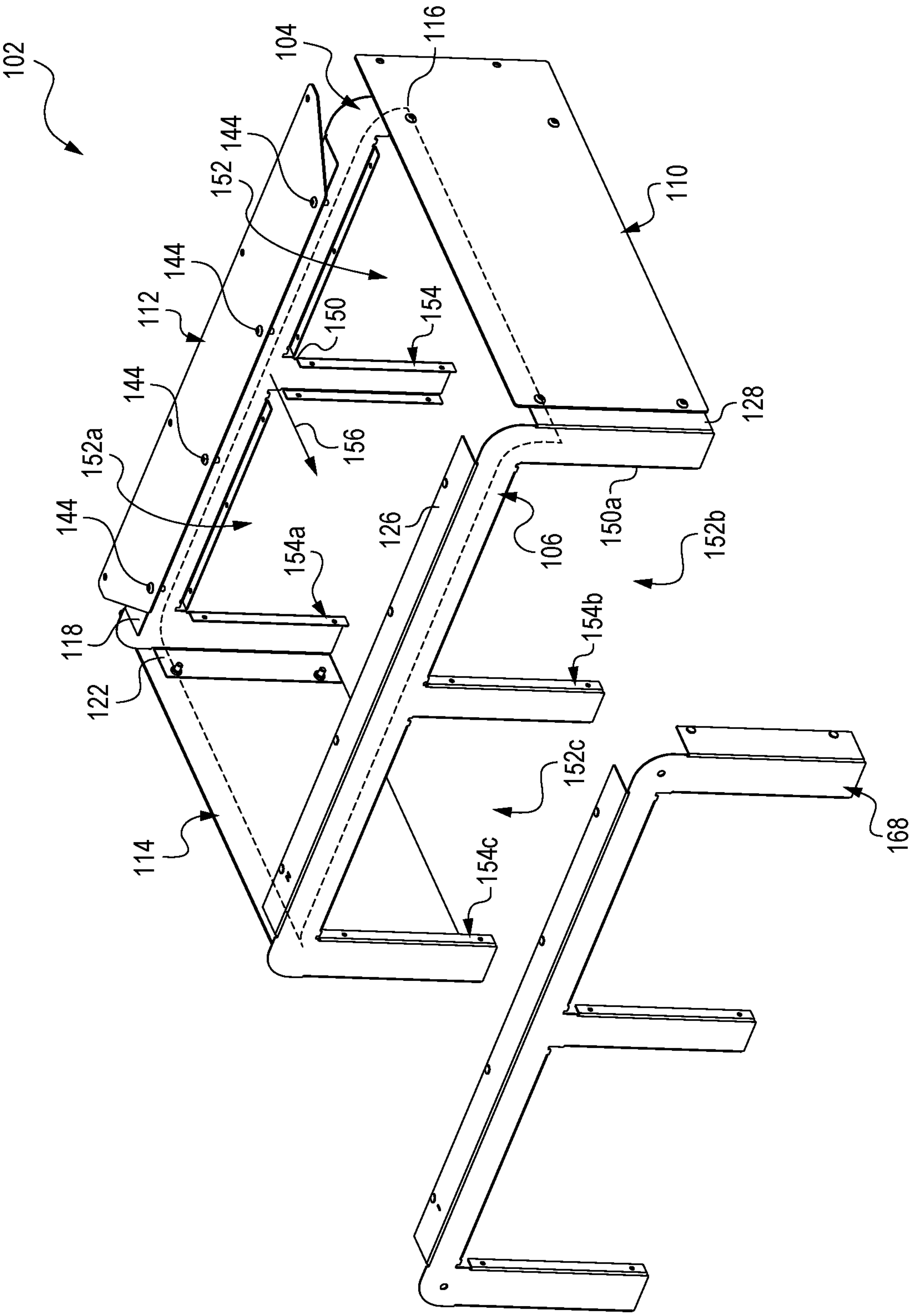
FIG. 11 illustrates the reinforcement members of the double wide reinforced visor of FIG. 2 by removing the outer panel(s), the inner panel(s), the inner reflectors, etc.
Figure 12:
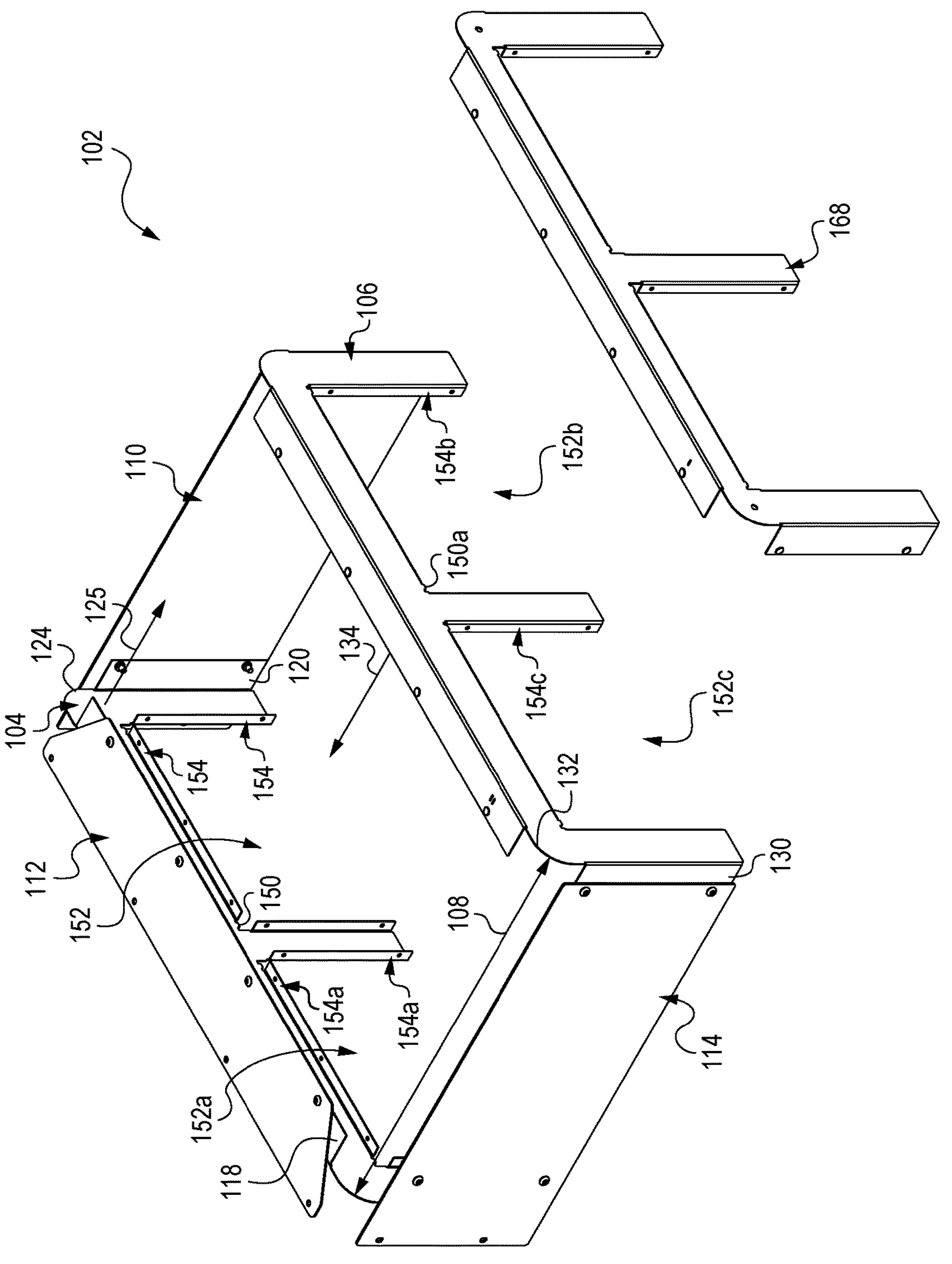
FIG. 12 is an alternate view of the reinforcement members of FIG. 11.

In FIGS. 11 and 12, the first rib bracket 104 may define a first inner perimeter 150 of the first m-shape with a first opening 152, and a second opening 152*a*. A first plurality of inner flanges 154 may be disposed adjacent the first opening 152 (e.g., one on each side of the opening), and a second plurality of inner flanges 154*a* may be disposed adjacent the second opening 152*a*. The first plurality of inner flanges 154, and the second plurality of inner flanges 154*a* may extend along the first same perpendicular direction 156 to the first inner perimeter 150.

The second rib bracket 106 may define a second inner perimeter 150*a* of the second m-shape with a third opening 152*b* aligned with the first opening 152, and a fourth opening 152*c* aligned with the second opening 152*a*. A third plurality of inner flanges 154*b* may be disposed adjacent the third opening 152*b*, and a fourth plurality of inner flanges 154*c* may be disposed adjacent the fourth opening 152*c*.

Figure 13:
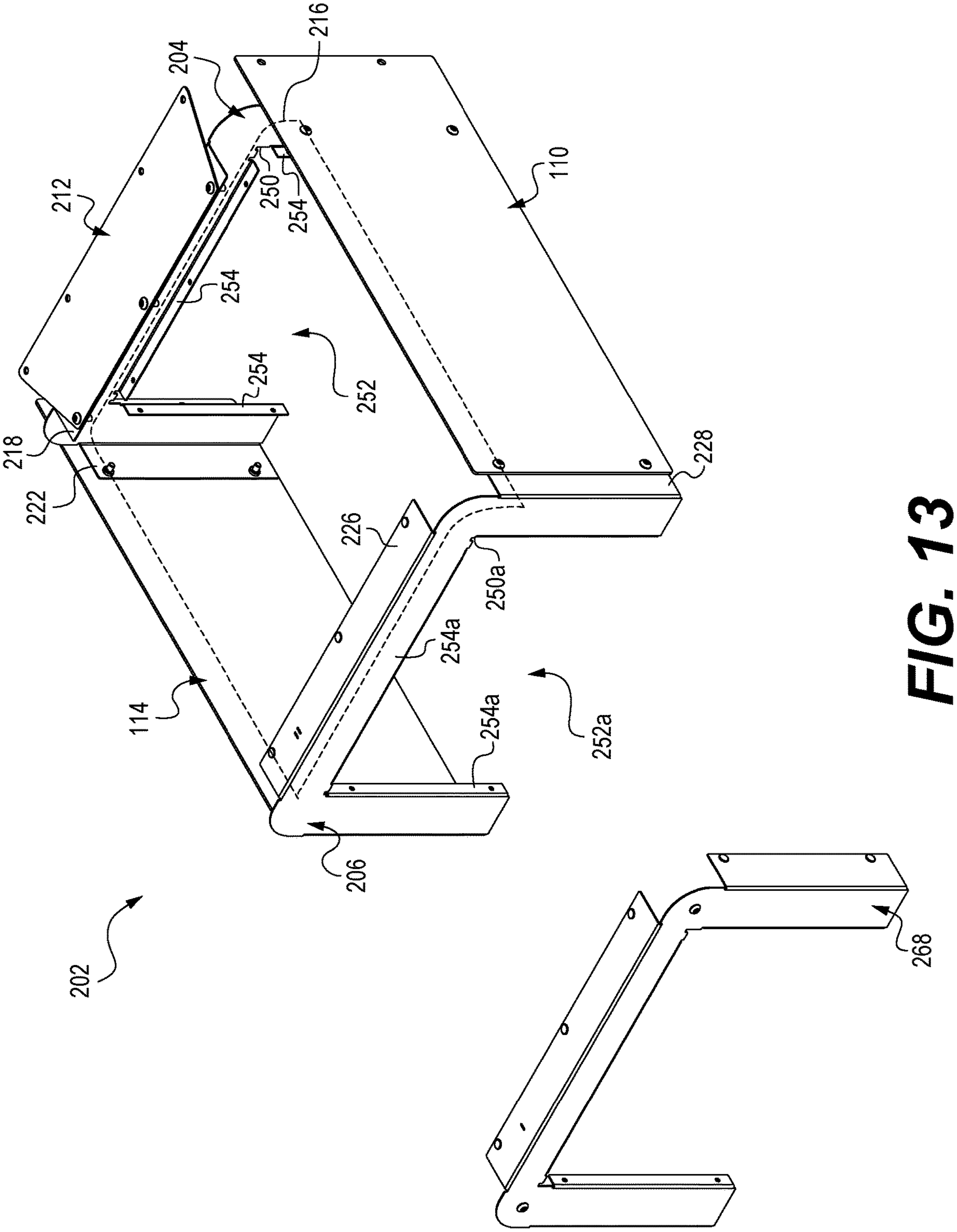
FIG. 13 illustrates the reinforcement members of the single wide reinforced visor of FIG. 4 by removing the outer panel(s), the inner panel(s), the inner reflectors, etc.
Figure 14:
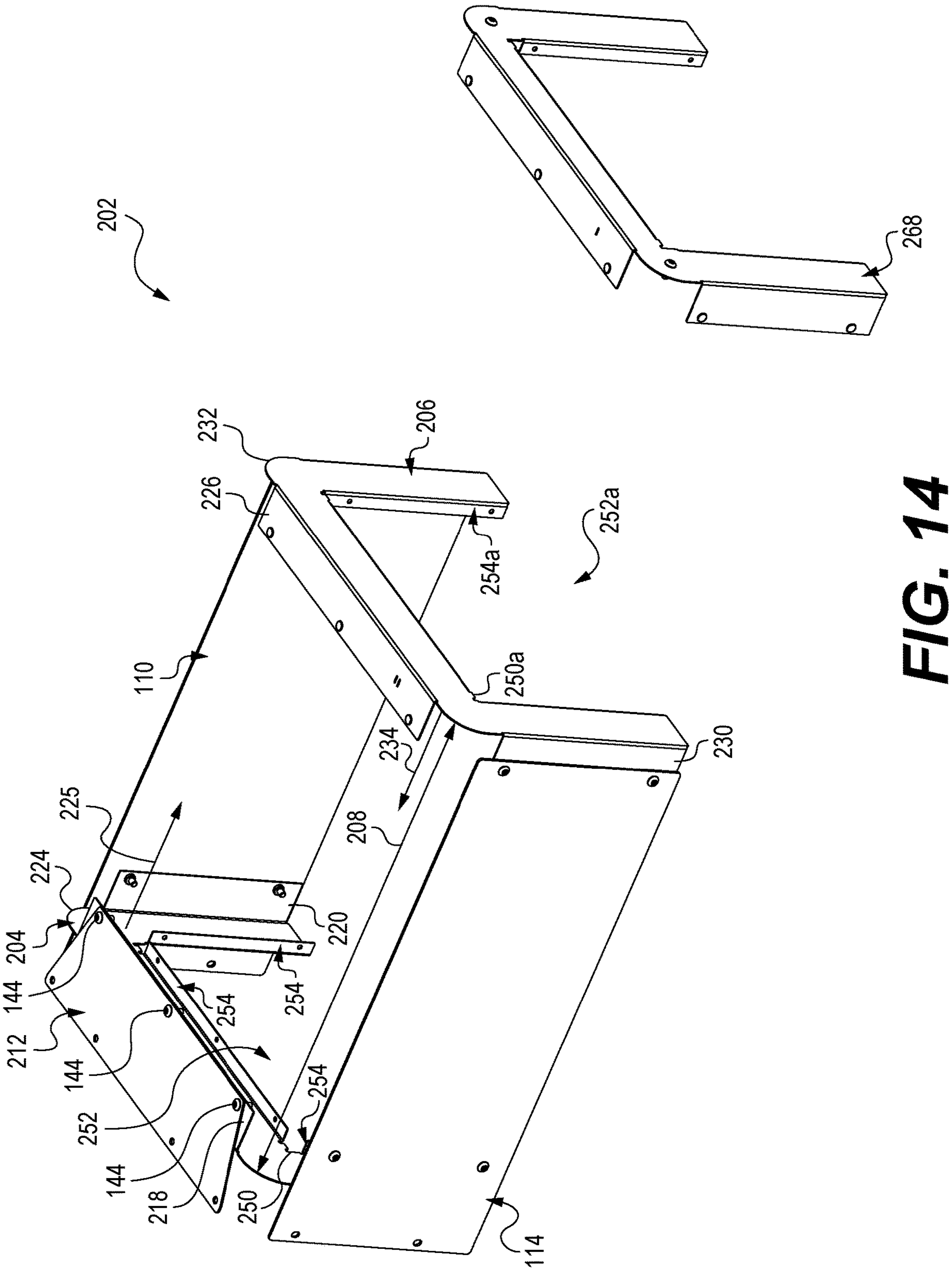
FIG. 14 is an alternate view of the reinforcement members of FIG. 13.

In FIGS. 13 and 14, the first rib bracket 204 may define a first inner perimeter 250 of the first n-shape with a first opening 252 and may further include a first plurality of inner flanges 254 disposed adjacent the first opening 252 that extend along the first same perpendicular direction 225 relative to the outer perimeter.

The second rib bracket 206 may define a second inner perimeter 250*a* of the second n-shape with a second opening 252*a* aligned with the first opening 252. Also, a second plurality of inner flanges 254*a* may be disposed adjacent the second opening 252*a* that extend in the first same perpendicular direction 225 as the outer flanges.

Figure 2:
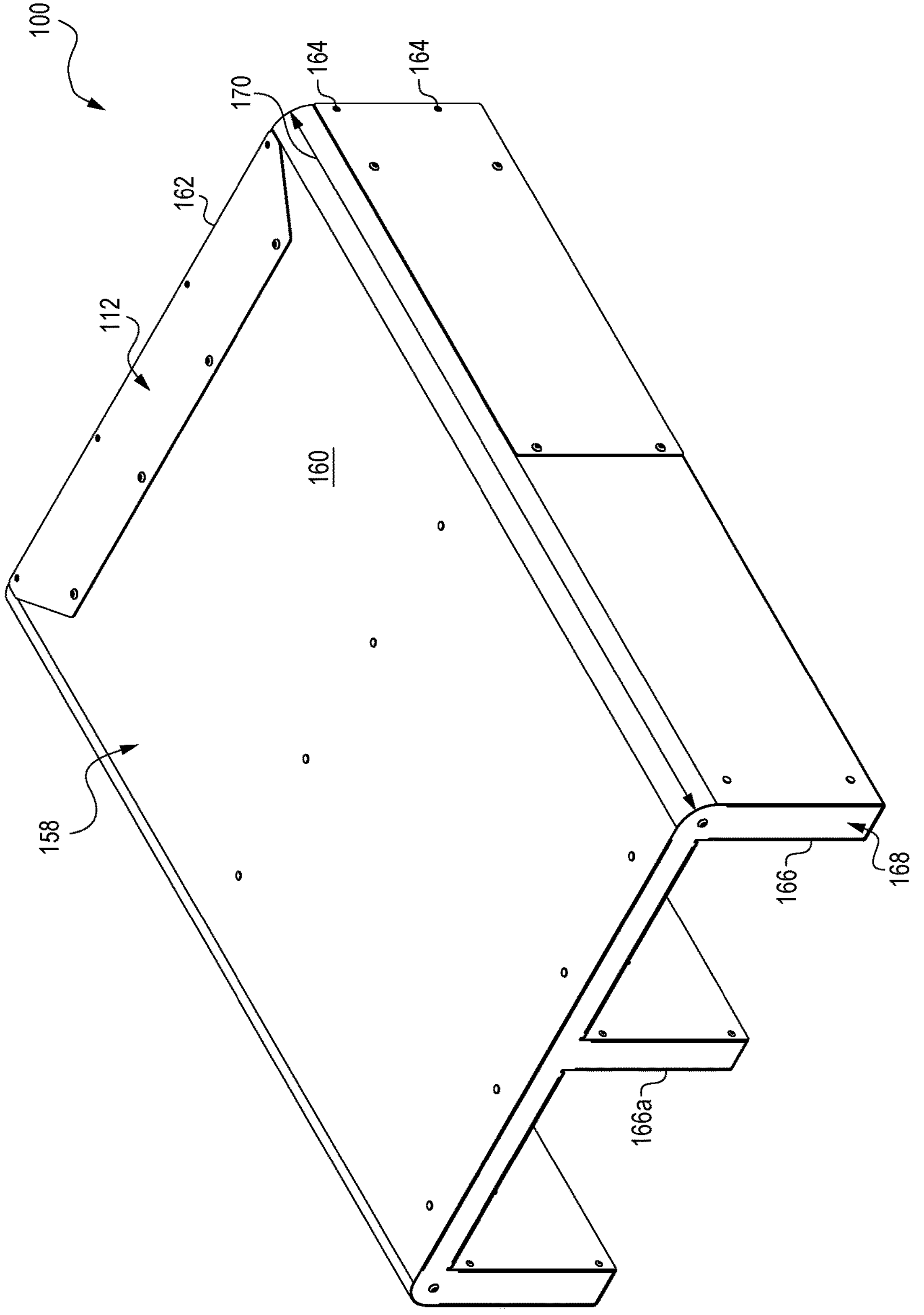
FIG. 2 is a front oriented perspective view of a double wide reinforced visor according to an embodiment of the present disclosure that may be used with a middle instance of a LED luminaire as shown in FIG. 1.
Figure 3:
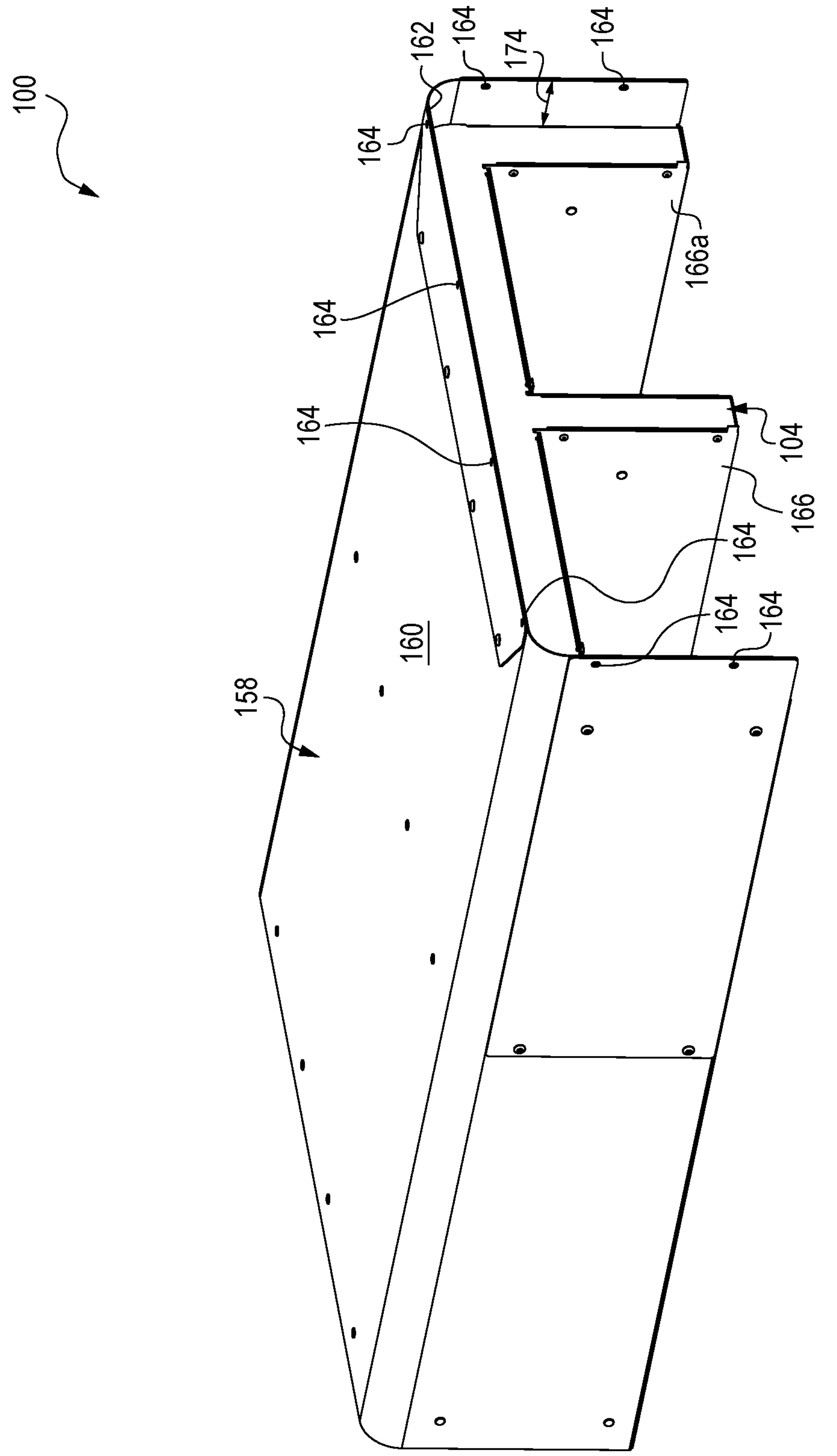
FIG. 3 is a rear oriented perspective view of the double wide reinforced visor of FIG. 2, showing the extension of the outer panel past the rearmost rib bracket for attaching the visor to a fixture of the luminaire.
Figure 4:
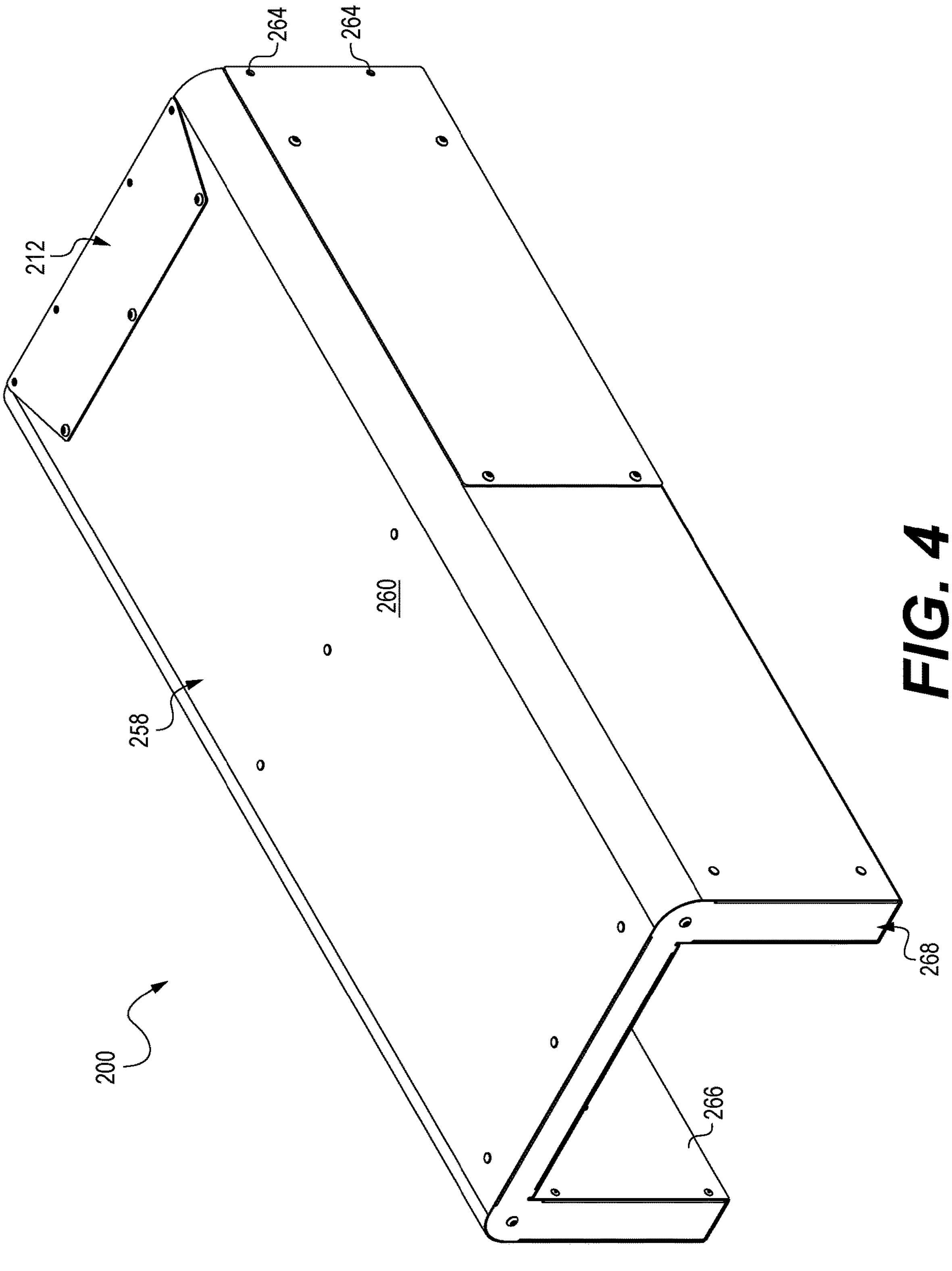
FIG. 4 is a front oriented perspective view of a single wide reinforced visor according to an embodiment of the present disclosure that may be used with a middle instance of a LED luminaire as shown in FIG. 1.

Referring to FIGS. 2 thru 4, along with 11 thru 14, a shell including at least a first outer shell member 158, 258 may be attached to the first top outer flange 118, 218, the first side outer flange 120, 220, the second side outer flange 122, 222, the second top outer flange 126, 226, the third side outer flange 128, 228, and the fourth side outer flange 130, 230. More particularly, the at least first outer shell member is an outer panel 160, 260 that is cut or punched to size, and then folded into a c-shape. The outer panel 160, 260 may define a free end 162, 262 that is spaced away from the first rib bracket 104, 204, creating an overhang. The outer panel 160, 260 may also define a plurality of fixture mounting holes 164, 264 disposed adjacent the free end 162, 262. These holes may be aligned with those of the top plate alluded to earlier herein so that fasteners may attach the top plate and the outer panel to the fixture or luminaire.

Moreover in FIG. 3, the shell may also include at least a first inner shell member 166 (e.g., this member may be split into three panels or not) that is attached to the first plurality of inner flanges 154, and the third plurality of inner flanges 154, and at least a second inner shell member 166*a* (e.g., this member may be split into multiple panels) that is attached to the second plurality of inner flanges 154*a*, and the fourth plurality of inner flanges 154*c*. In FIG. 2, an end bracket 168 (may be similarly or identically configured as the first rib bracket and/or the second rib bracket) may be attached to the outer panel, the first inner shell member, and the second inner shell member.

Figure 5:
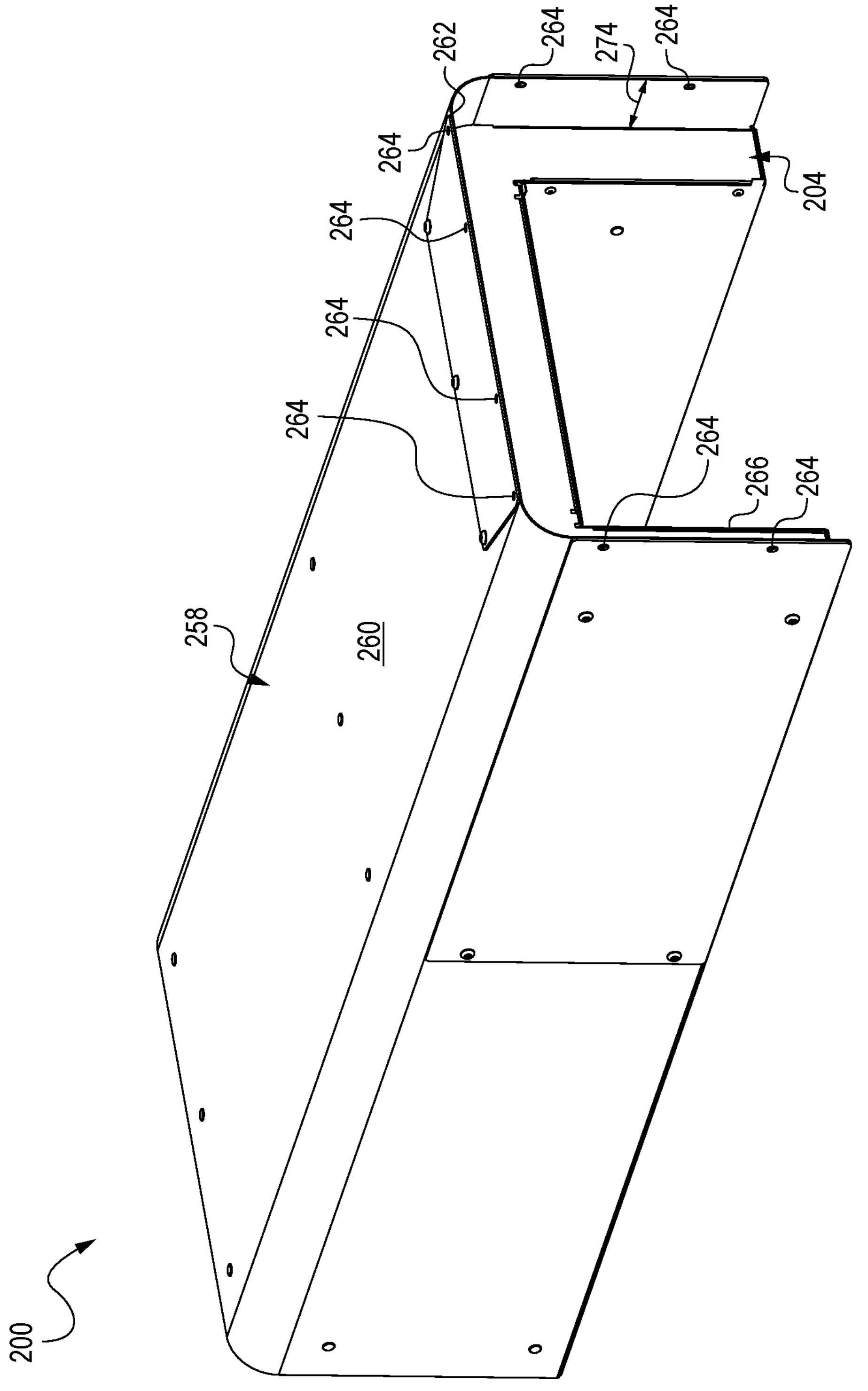
FIG. 5 is a rear oriented perspective view of the single wide reinforced visor of FIG. 4, showing the extension of the outer panel past the rearmost rib bracket for attaching the visor to a fixture of the luminaire.
Figure 6:
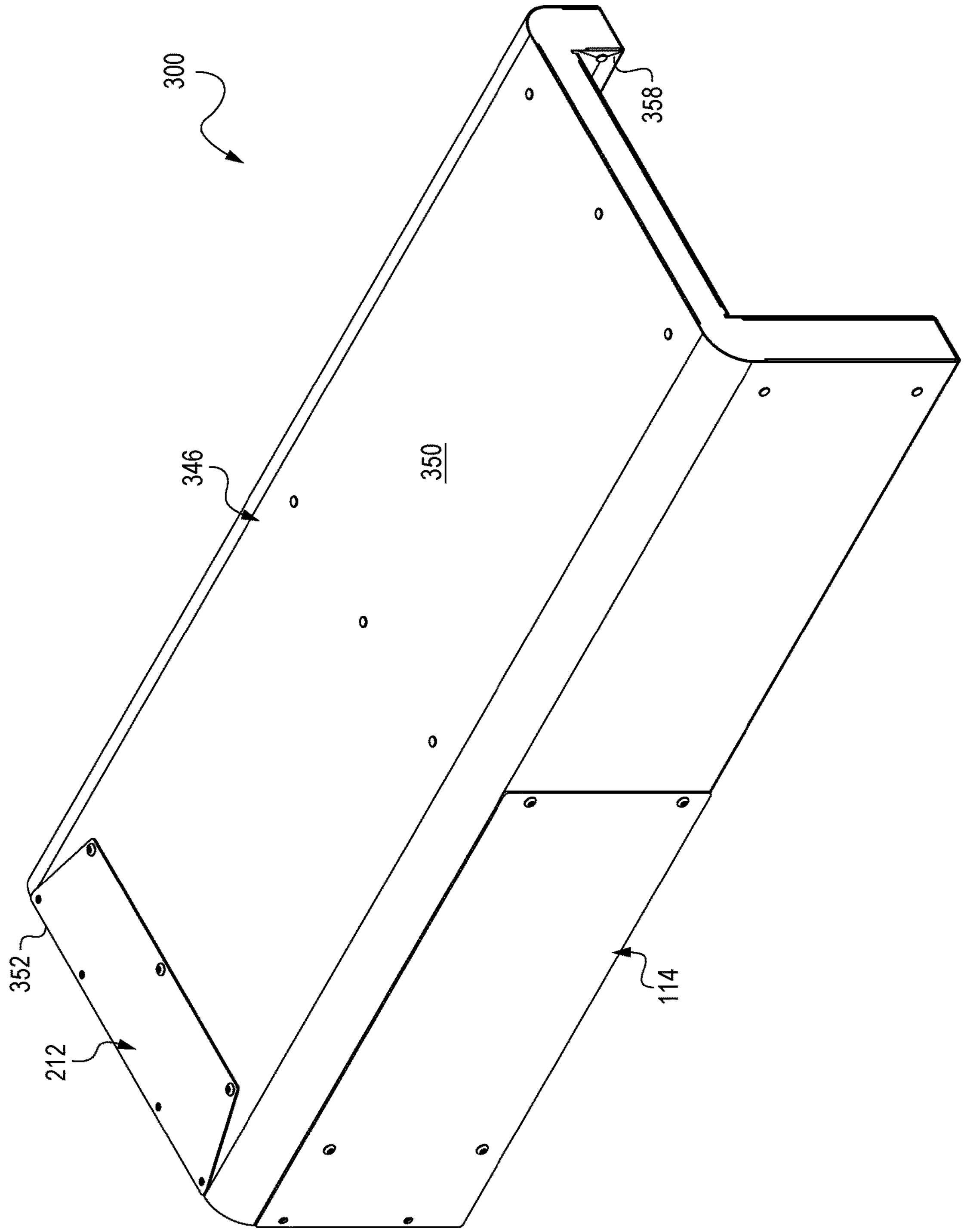
FIG. 6 is a front oriented perspective view of a left side glare control reinforced visor according to an embodiment of the present disclosure that may be used as with a left instance of a LED luminaire as shown in FIG. 1.
Figure 7:
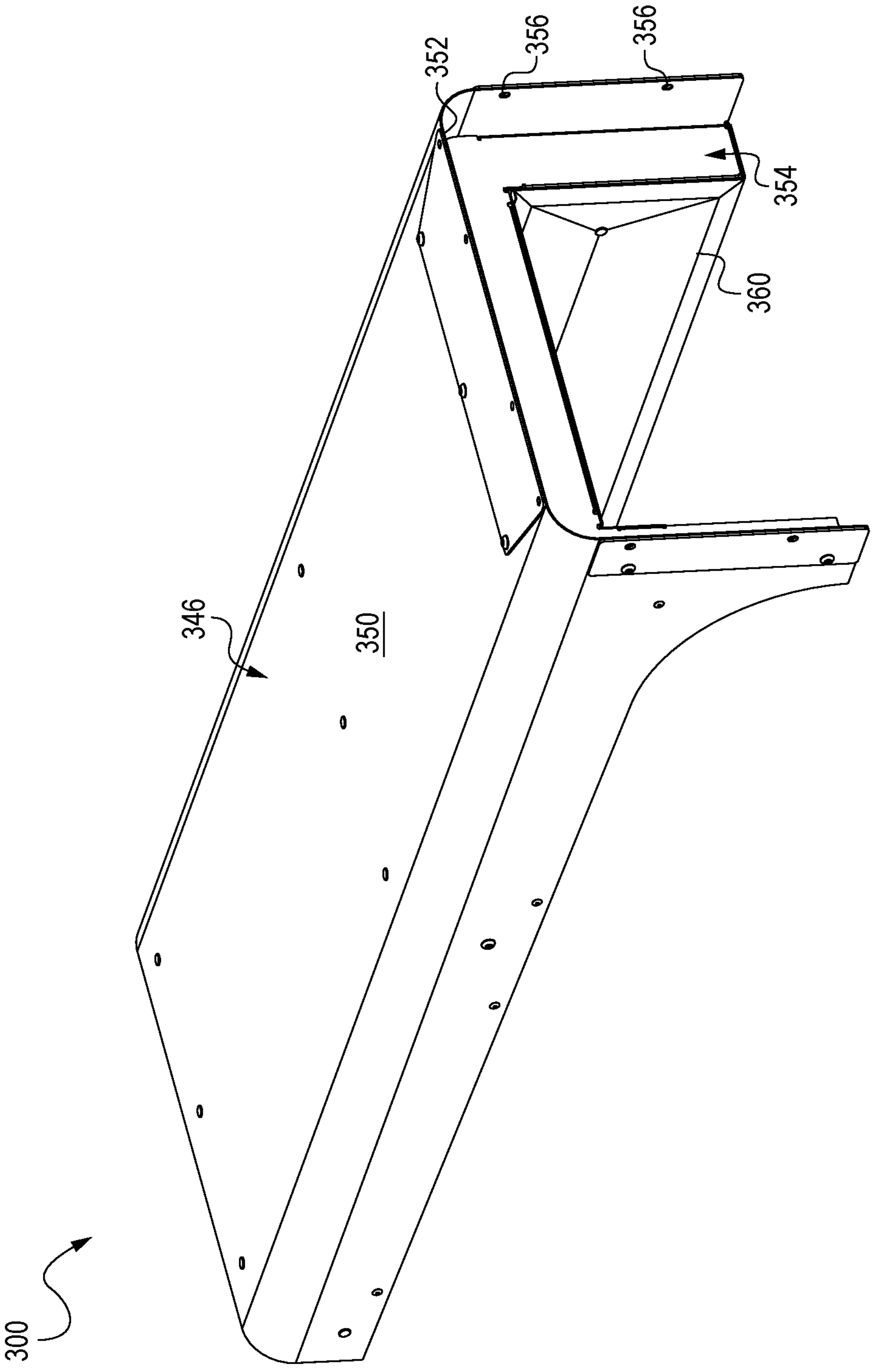
FIG. 7 is a rear oriented perspective view of the left side glare control reinforced visor of FIG. 6, depicting the extension of the outer panel past the rearmost rib bracket for attaching the visor to a fixture of the luminaire.

In FIG. 5, the shell includes at least a first inner shell member 266 (e.g., may be split into multiple panels) that is attached to the first plurality of inner flanges 254, and the second plurality of inner flanges 254*a*. Also in FIG. 4, an end bracket 268 (may be similarly or identically configured as the first rib bracket and/or the second rib bracket) may be attached to the outer panel, and the first inner shell member etc.

Figure 10:
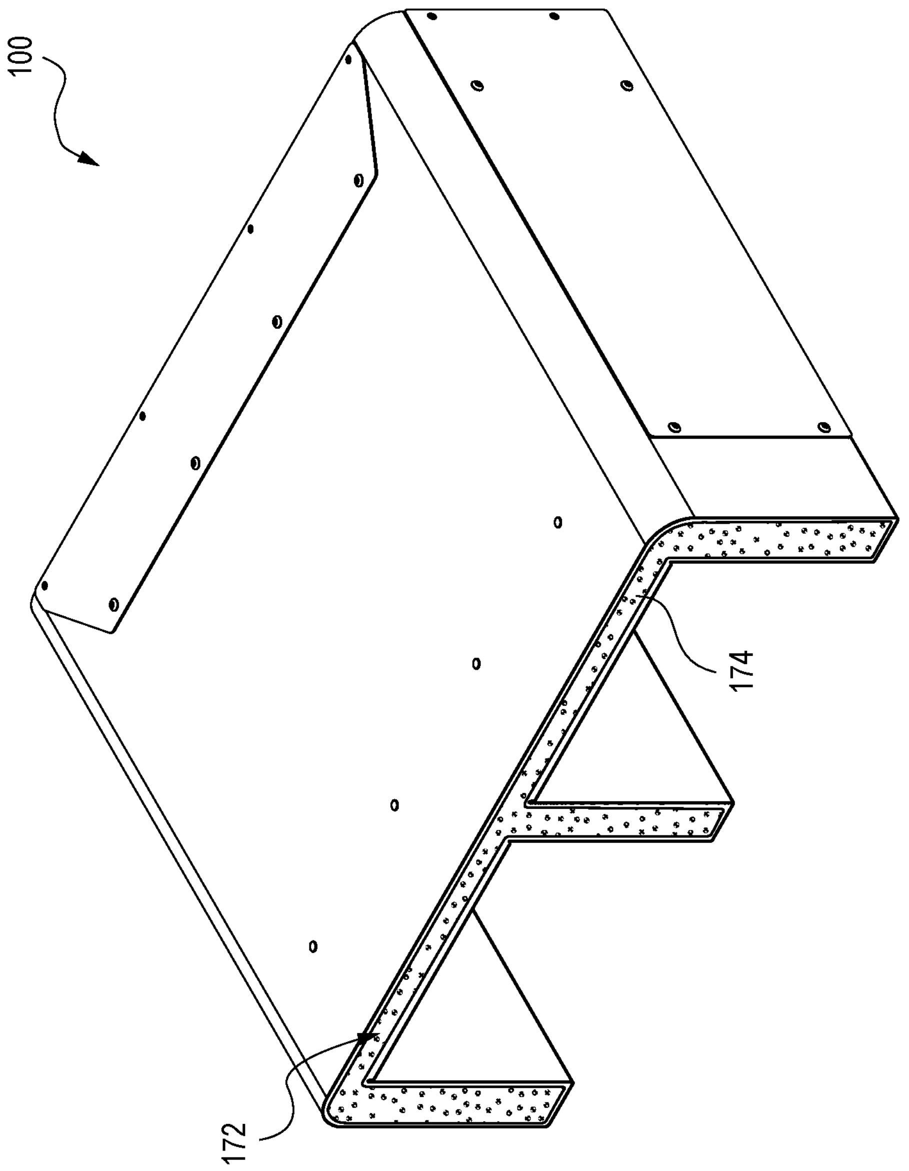

Looking at FIGS. 2 and 12 together, the visor 100 may define a visor length 170, and a ratio of the visor length 170 to the first predetermined distance 108 may range from 1.75 to 2.5 in some embodiments of the present disclosure. Other ratios may be used in other embodiments of the present disclosure. Similar statements may be made concerning visors 200, 300, and 300*a*. Also as shown in FIG. 10, the shell may define an interior cavity 172, and a foam core 174 may be disposed in the interior cavity 172, but not necessarily so. Again, similar statements may be made concerning visors 200, 300, and 300*a*.

Turning now to FIGS. 6 thru 9, other reinforced visors 300, 300*a* for use with a luminaire or its fixture (e.g., see 50 in FIG. 1) will be described. It should be noted that visors 300, and 200 may be used in the left and right instances 58, 60 respectively as shown in FIG. 1, but not necessarily so. It is to be understood that depending on the direction a driver approaches the visor, the glare control portion may be facing the driver. Visor 300 may be referred to as a left side visor, while visor 300*a* may be referred to as right side 300 since it is essentially the same as visor 300 but is mirrored to provided left side glare control instead of right side glare control. Again, they may be switched.

Figure 15:
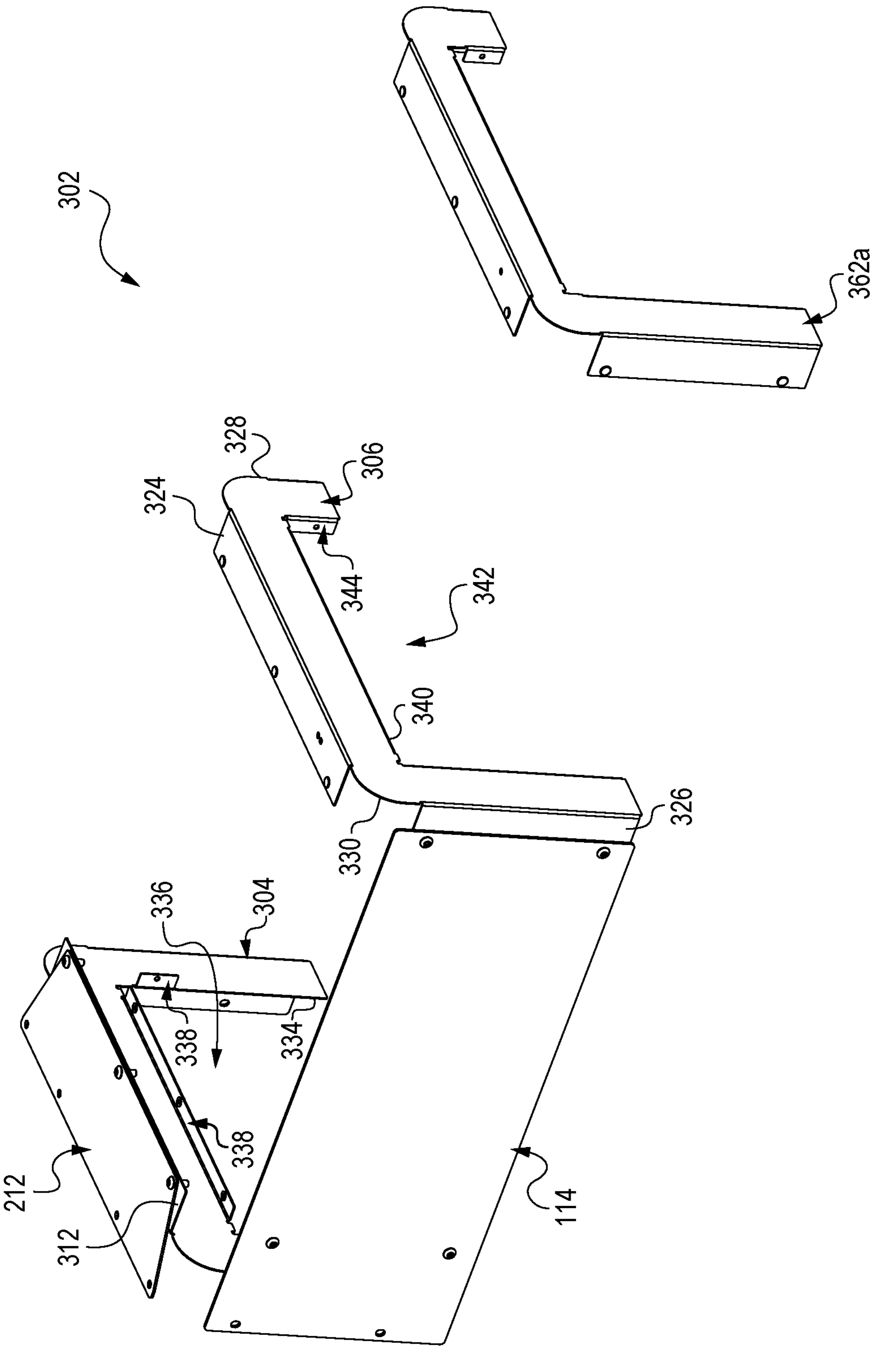
FIG. 15 shows the reinforcement members of the left side glare control reinforced visor of FIG. 6 by removing the outer panel(s), the inner panel(s), the inner reflectors, etc.
Figure 16:
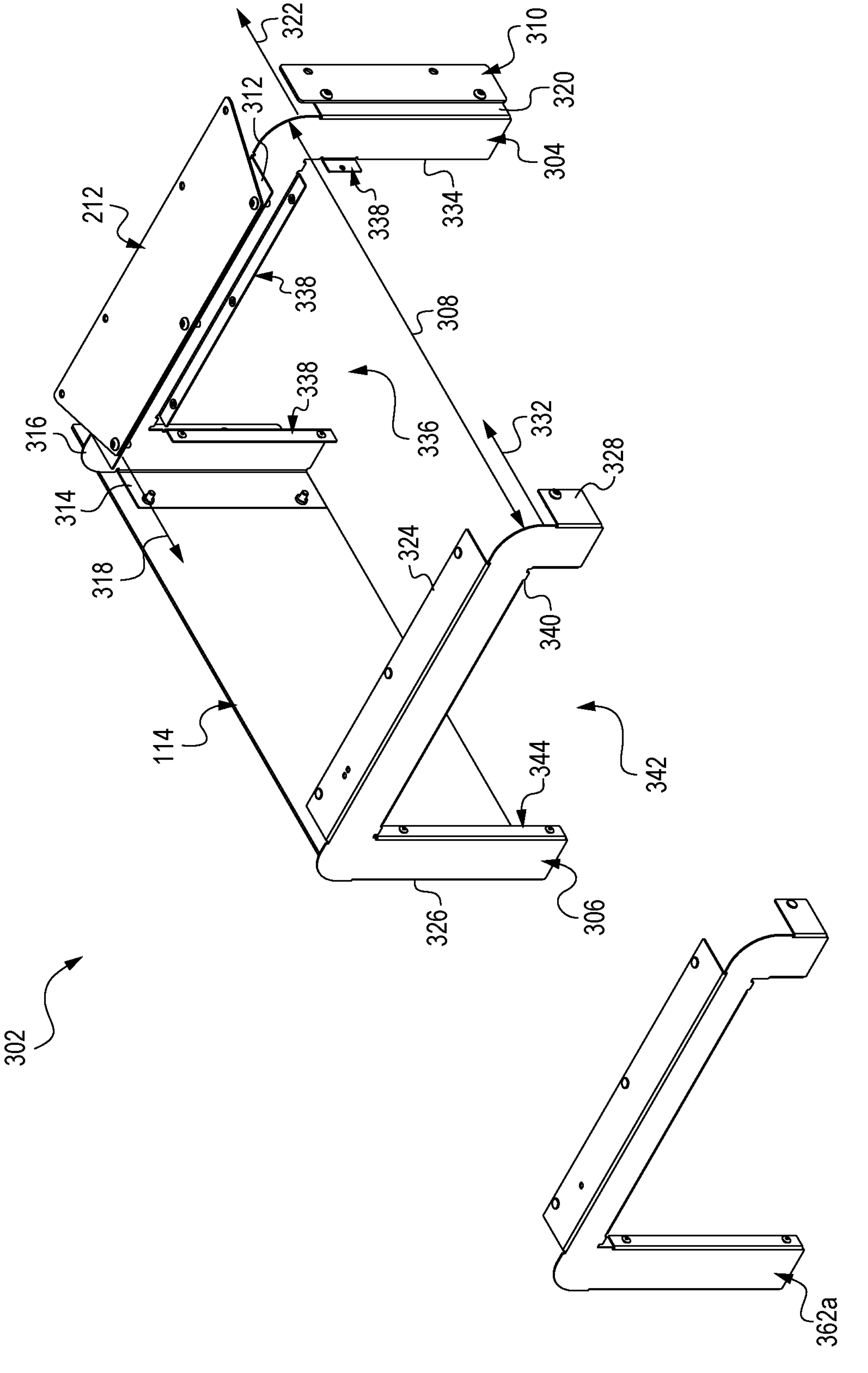
FIG. 16 is an alternate view of the reinforcement members of FIG. 15.
Figure 17:
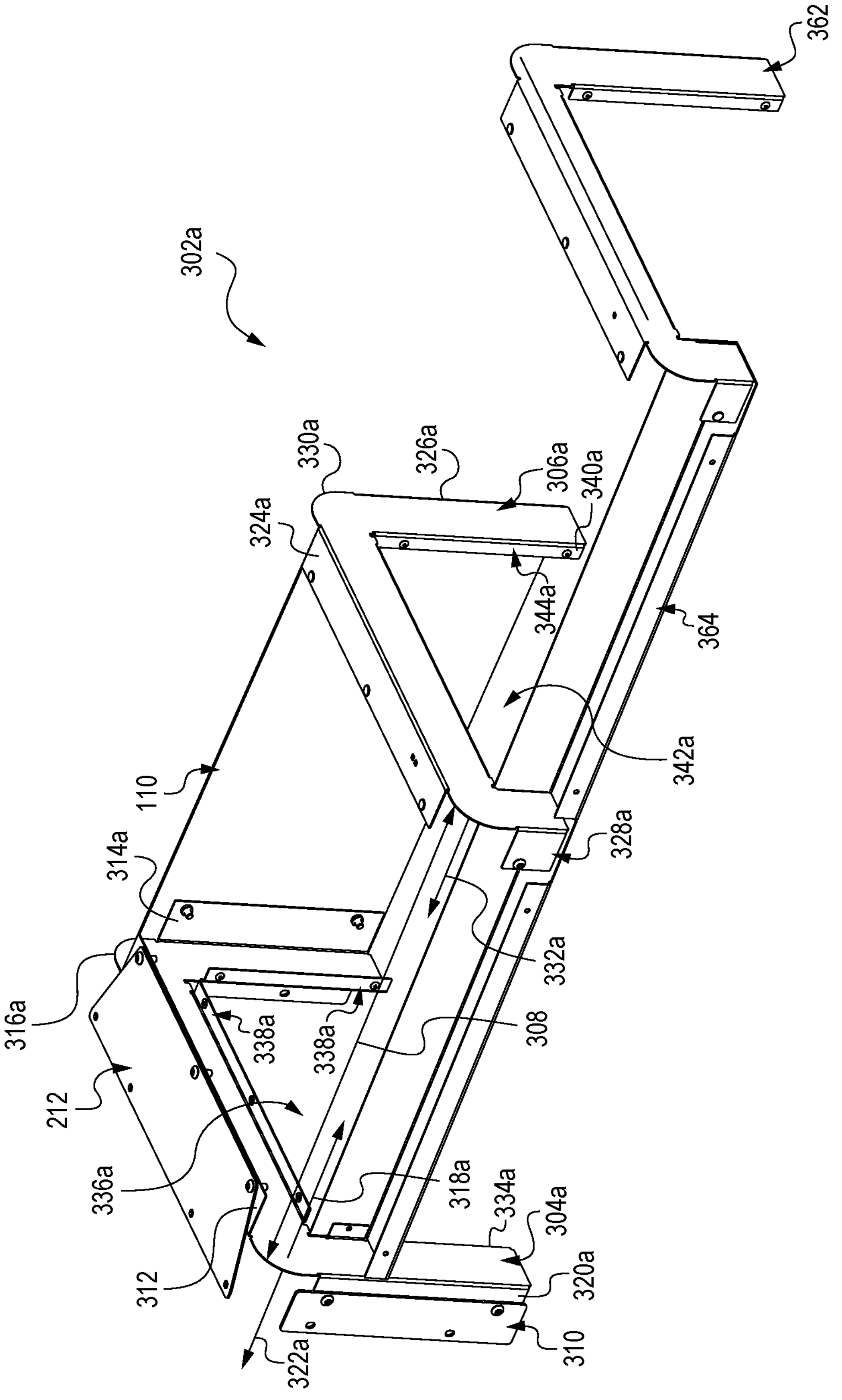
FIG. 17 depicts the reinforcement members of the right side glare control reinforced visor of FIG. 8 with a C-shaped channel shown for forming the left side of the visor that is shallower for allowing light to be directed pas the left side of the visor.

In FIGS. 15 thru 17, these visors 300, 300*a* include a reinforcement system 302, 302*a* including a first rib bracket 304, 304*a* with a first n-shape, a second rib bracket 306, 306*a* with a first j-shape (when viewed from its side, so called since one of its vertical legs is shorter than the other) that is spaced away from the first rib bracket 304, 304*a* a first predetermined distance 308 (may be the same as the first predetermined distance 108, 208 mentioned earlier herein with the same values but not necessarily so).

A first reinforcement member may be attached to the first rib bracket 304, 304*a* that may take various forms such as a first side plate (110 or 114) that is also attached to the second rib bracket 306, 306*a*. The first reinforcement member may also take the form of a second side plate 310 that is attached to the first rib bracket 304, 304*a* alone. This may not be the case for other embodiments of the present disclosure. Alternatively, the first reinforcement member may take the form of the top plate 212 that is attached to the top outer flange 312 of the first rib bracket 304, 304*a*.

More specifically, the first rib bracket 304, 304*a* may further comprise a first top outer flange 312, and a first side outer flange 314, 314*a* that extends from a first outer perimeter 316, 316*a* of the first rib bracket 304, 304*a* along a first perpendicular direction 318, 318*a* relative to the first outer perimeter 316. In addition, a second side outer flange 320, 320*a* may extend from the first rib bracket 304, 304*a* along a second perpendicular direction 322, 322*a* that is opposite of the first perpendicular direction 318, 318*a*. The second side plate 310 may be attached to the second side outer flange 320, 320*a*.

Figure 18:
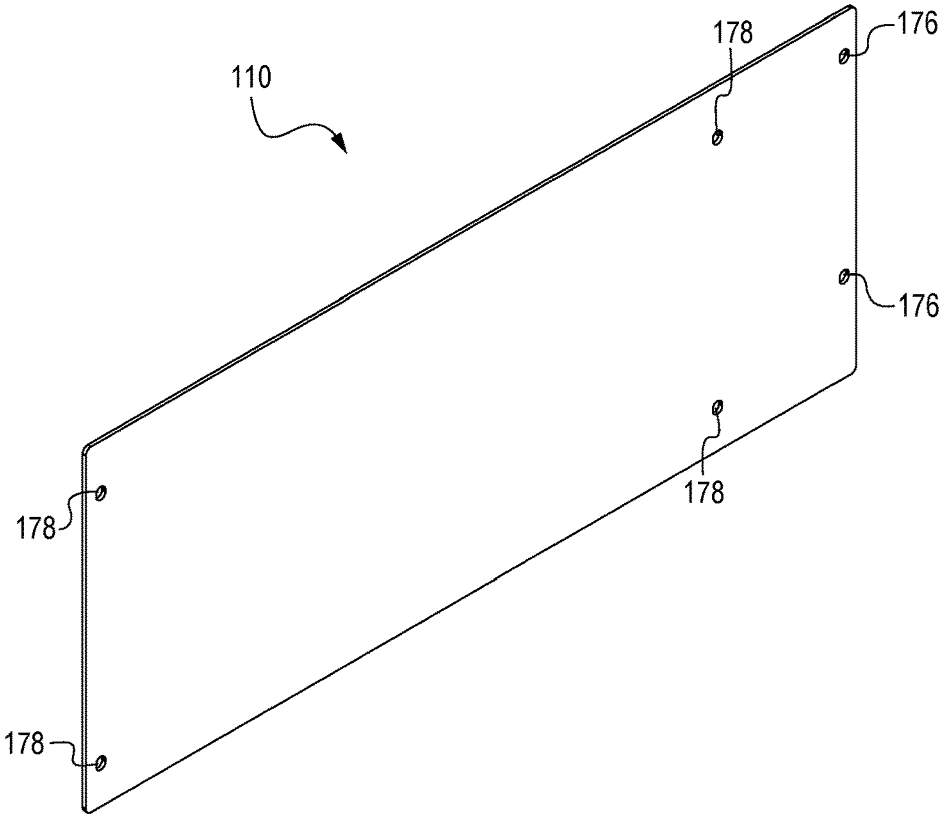
FIG. 18 shows a right side reinforcement plate that is shown in FIGS. 2 thru 5, etc. shown in isolation.
Figure 19:
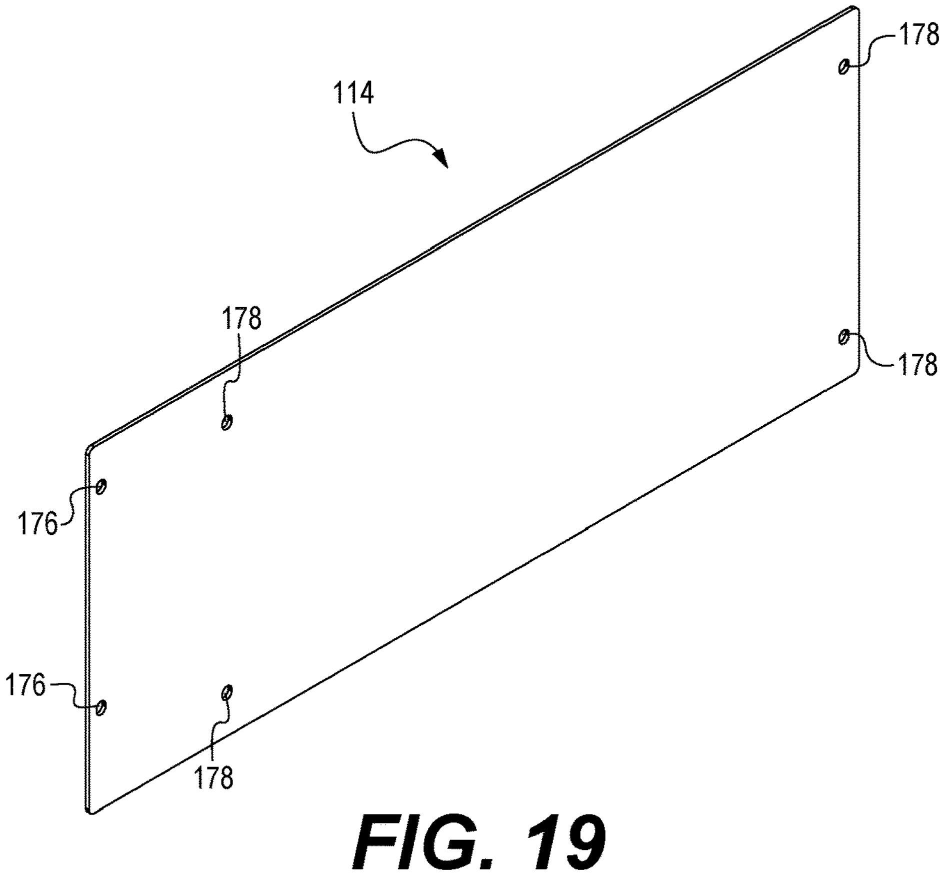
FIG. 19 illustrates a left side reinforcement plate that is shown in FIGS. 6 and 7, etc.
Figure 22:
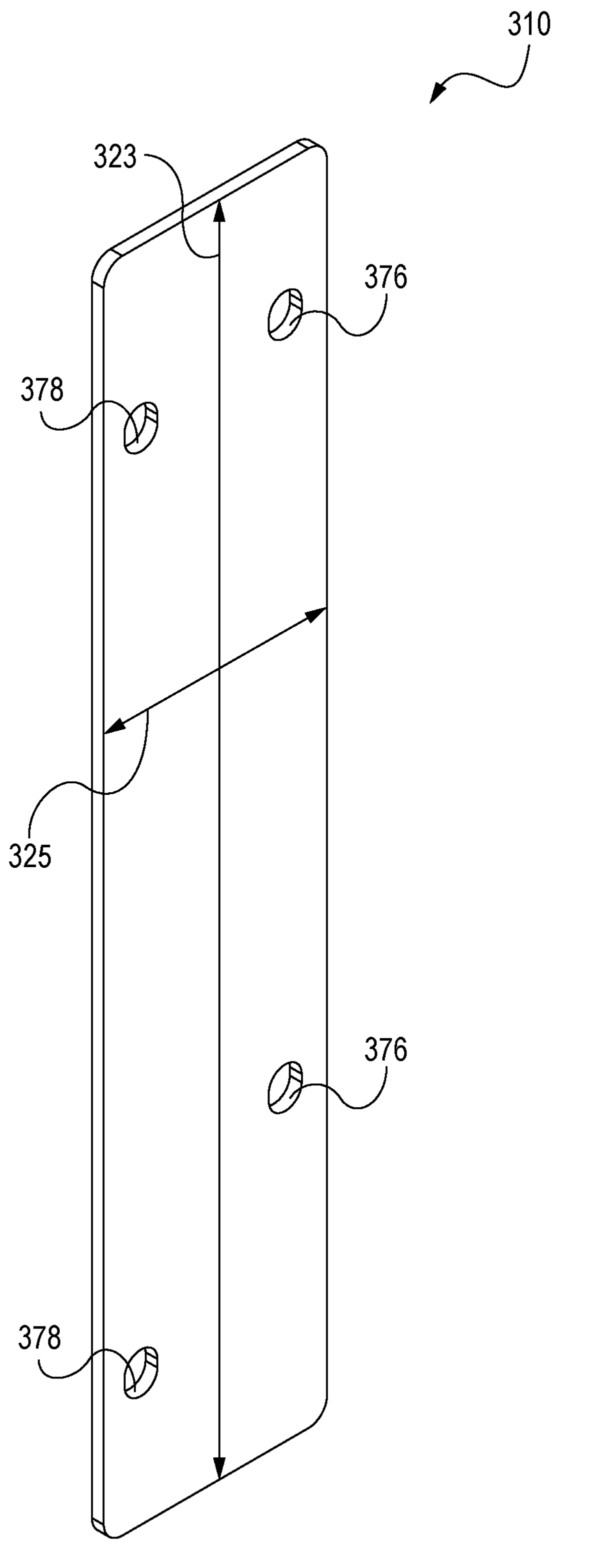
FIG. 22 shows a small side reinforcement plate shown in FIGS. 7, 9, 16 and 17.

In FIG. 22, the second side plate defines a height 323, and a width 325 that is less than that of the first side plate (e.g., see 110 or 114). In some embodiments, a ratio of the height 323 to the width 325 ranges from 4.14 to 6.0. This may not be the case for other embodiments of the present disclosure. In FIGS. 18, and 19, this ratio may range from 0.34 to 0.5. The height in either case may be about 7.5 inches.

Looking at FIGS. 15 thru 17, the second rib bracket 306, 306*a* comprises a second top outer flange 324, 324*a*, a third side outer flange 326, 326*a*, and a fourth side outer flange 328, 328*a* that extend from a second outer perimeter 330,

330*a* of the first j-shape along a same perpendicular direction 332, 332*a* to the second outer perimeter 330, 330*a*. The first side plate (see 110 or 114) may be attached to the first side outer flange 314, 314*a*, and the third side outer flange 326, 326*a*. The fourth side outer flange 328, 328*a* may be shorter vertically than the third side outer flange 326, 326*a*, but not necessarily so.

Similar to what has been disclosed earlier herein, the first rib bracket 304, 304*a* may define a first inner perimeter 334, 334*a* of the first n-shape with a first opening 336, 336*a*. A first plurality of inner flanges 338, 338*a* may be disposed adjacent the first opening 336, 336*a*. Furthermore, the second rib bracket 306, 306*a* may define a second inner perimeter 304, 340*a* of the first j-shape with a second opening 342, 342*a* aligned with the first opening 336, 336*a* of the first rib bracket 304, 304*a*. A second plurality of inner flanges 344, 344*a* may be disposed adjacent the second opening 342, 342*a* that extend along the same perpendicular direction 332, 332*a*.

Referring back to FIGS. 6 thru 9, a shell may be provided that includes at least a first outer shell member 346, 346*a* that is attached to the first top outer flange 312, the first side outer flange 314, 314*a*, the second side outer flange 320, 320*a*, the second top outer flange 324, 324*a*, the third side outer flange 326, 326*a*, and the fourth side outer flange 328, 328*a*. As described earlier herein, the first outer shell member 346 may be an outer panel 350, 350*a* that is a unitary, but not necessarily so. For example, an auxiliary side panel may be supplied, etc.

As also previously mentioned, the outer panel 350, 350*a* may have a free end 352, 352*a* that is spaced away from the first rib bracket, forming an overhang or space 354, 354*a* to receive the fixture for attachment thereto. This may not be the case in other embodiments of the present disclosure. Moreover, the outer panel 350, 350*a* may define a plurality of fixture mounting holes 356 disposed adjacent the free end 352, 352*a* some of which line up with holes of the various reinforcing members so that the reinforcement members and the outer panel may be attached to the fixture.

The shell may also include at least a first inner shell member (e.g., see reflectors 358, 360) that is attached to the first plurality of inner flanges 338, 338*a*, and the second plurality of inner flanges 344, 344*a* either directly or indirectly.

Figure 8:
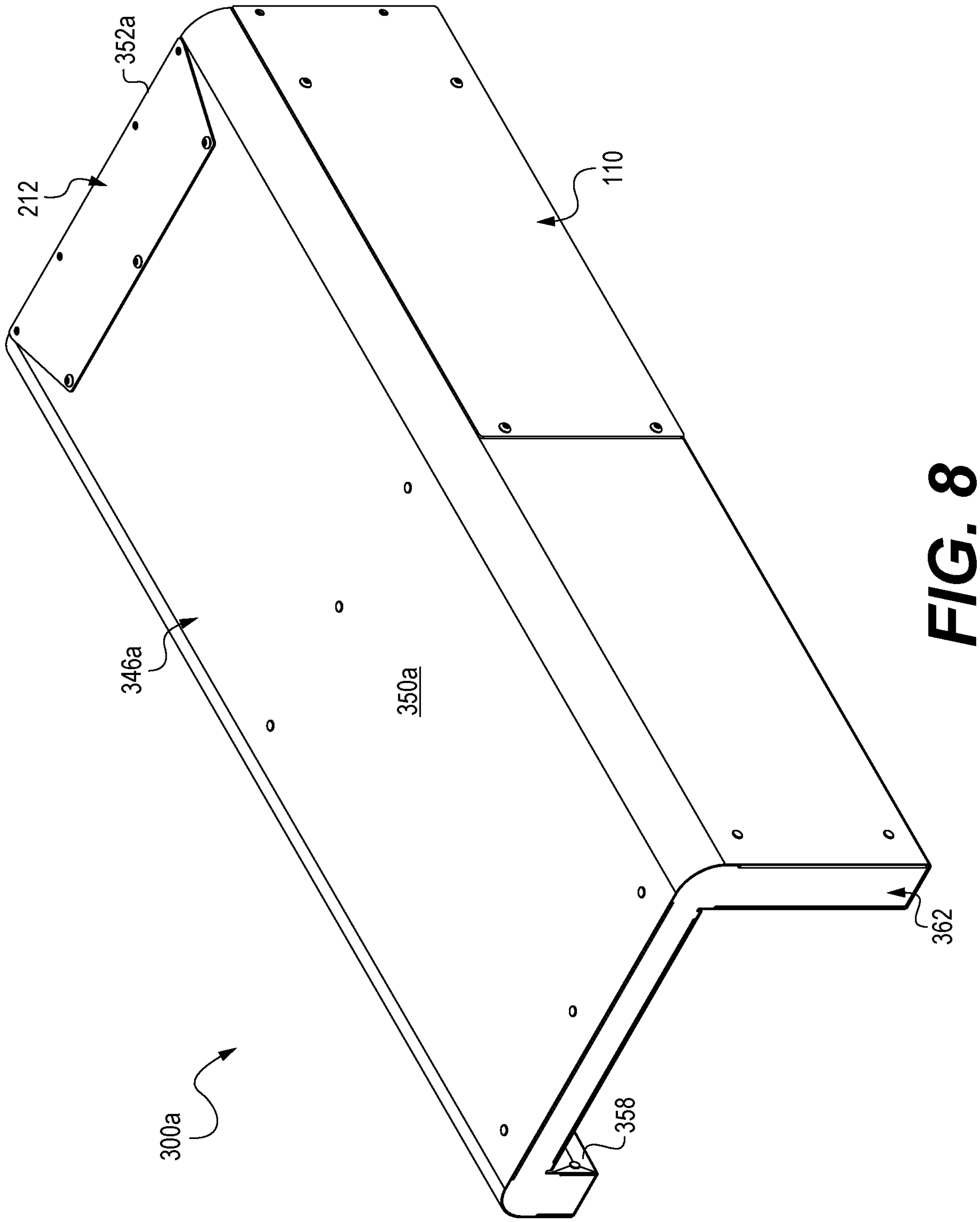
FIG. 8 is a front oriented perspective view of a right side glare control reinforced visor according to another embodiment of the present disclosure that may be used with a right instance of a LED luminaire as shown in FIG. 1.

Looking at FIGS. 8 and 17 together, an end bracket 362 may be attached to the outer panel 350*a*, inner shell member(s). FIGS. 15 and 16 show a mirror image denoted by end bracket 362*a*. The end bracket 362, 362*a* may be similarly or identically configured as the second rib bracket 306, 306*a*, but not necessarily so.

In FIG. 17, c-shaped channel member(s) 364 may be provided that extend from the end bracket 362 to the second rib bracket 306*a*, and from the second rib bracket 306*a* to the first rib bracket 304*a* adjacent to the second side plate 310. Though not shown, similar statements may be made of the visor 300 shown in FIGS. 15 and 16.

As used herein unless otherwise stated, similarly or identically configured means that one member has features with dimensions are within a reasonable manufacturing tolerance such as +/−0.02 of an inch of the features of another member.

INDUSTRIAL APPLICABILITY

In practice, one or more of the following components, assemblies, or subassemblies may be provided initially at the first point of sale in an original equipment manufacturer (OEM) context, or as a replacement part or substitutable part in an aftermarket context: a reinforcement member, a rib bracket, a reinforcement system, a top plate, a side plate, and/or a visor assembly, etc.

In particular, the side plates, and the top plate may be provided as replacement parts in the field.

For example, large side plates 110, 114 shown in FIGS. 18 and 19 may be provided that include a rectangular array of mounting holes 178 for attaching to the rib brackets, and a pair of mounting apertures 176 that are used later to attach the visor to the fixture of the luminaire. The top instance of the mounting apertures 176 may be horizontally aligned with the top instances of the mounting holes 178 while the bottom instance of the mounting apertures is higher than the bottom instances of the mounting holes. Consequently, the vertical distance between the mounting apertures is less than that between the mounting holes.

FIGS. 20 and 21 disclose a large top plate 112, and small top plate 212. A detailed description for these components has already been given earlier herein therefore further description is not needed.

FIG. 22 shows the small side plate 310 by itself. It too has mounting holes 378 positioned similar to those of the large side plates with a similar spacing except only two are provided instead of a rectangular array given its short width 325. Mounting holes 378 similar to those of the large side plates are also provided with a similar spacing.

As disclosed earlier herein, a reinforced visor for use with a luminaire according to various embodiments of the present disclosure may be more wind resistant and overall stiffer and more robust.

In general terms, these visors 100, 200, 300, 300*a* have various common features such as an exterior shell for housing a foam core or other core made of lightweight material. The exterior shell may be made of an outer panel(s) 160, 260, 350, and 350*a*. Also, interior panels such as first inner shell member 166, 266 second inner shell member 166*a* 160, and reflectors 358, 360, etc. A first interior end rib bracket (e.g., see 104, 204, 304, 304*a*) and at least a first exterior reinforcement member. Typically, three such members are provided including a top plate 112, 212, and a pair of side plates 110, 114, 310 (these top and side plates may be made unitary) that are attached to the rib bracket.

Figure 9:
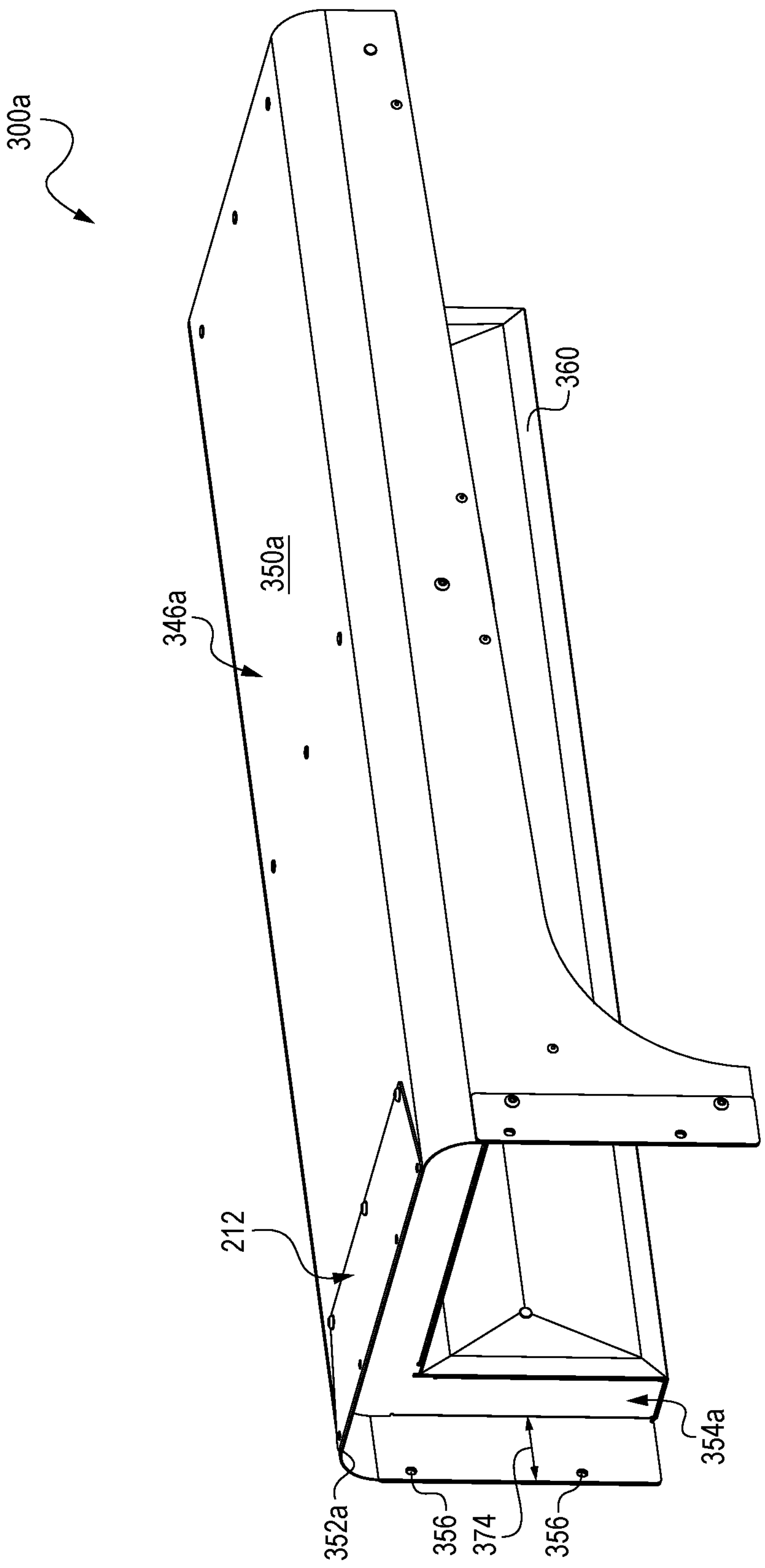
FIG. 9 is a rear oriented perspective view of the right side glare control reinforced visor of FIG. 8, depicting the extension of the outer panel past the rearmost rib bracket for attaching the visor to a fixture of the luminaire.

More specifically as best seen in FIGS. 3, 5, and 9, the exterior shell extends an overhang distance 174, 274, 374 measured from the first interior rib bracket to a free end of the exterior shell. The at least first exterior reinforcement member (e.g., outer panel 160, 260, 350, 350*a*) is attached to the first interior rib member (e.g., see 104, 204, 304, 304*a*) with the exterior shell interposed between the at least first exterior reinforcement member and the first interior end rib bracket.

When the at least first exterior reinforcement member is a top plate 112, 212, it may be a top exterior plate (since it sits on top of the outer panel) that extends adjacent the free end 162, 262, 352 of the exterior shell and includes a plurality of mounting apertures (e.g., see 142, 242) disposed adjacent the free end.

When the at least first exterior reinforcement member is a first or second exterior side plate (see 110, 114, 310), it may extend adjacent the free end of the exterior shell and include a plurality of mounting apertures 176, 376 (see FIGS. 6 thru 8) disposed adjacent the free end 162, 262, 352.

The first exterior side plate may also be attached to a second interior rib bracket (so called since it is closer to the middle of the visor) with the outer shell interposed between the second interior rib bracket and the first exterior side plate.

Likewise, the second exterior side plate may also be attached to the second interior rib bracket with the outer shell interposed between the second interior rib bracket and the second exterior side plate.

The various panels, reinforcement members, and brackets may be manufactured from sheet metal such as aluminum, stainless steel, etc. The outer configurations may be punched to size as well as any holes or apertures. Then, they may be folded into a desired configuration.

Alternatively, the perimeter of these components may be wire EDM (electric discharge machine) cut or laser cut, etc. to size along with their apertures and then folded into the desired configuration.

Various components such as exterior components may be anodized, powder coated, etc. to increase wear and/or corrosion resistance.

By adding the reinforcement members near the free end of the outer shell that is attached to a fixture of a luminaire, the local thickness may be tripled. For example, the exterior or outer panel of the shell may be about 0.040 of an inch thick while the reinforcement member may be about 0.060 to 0.080 of an inch thick. This means that in terms of bending, the visor may be locally at least 27 times stiffer. Also, the creation of the reinforcement frame helps to resist torsional forces. As a result, the inventors expect the visor to be more robust than previous visors and should be able to withstand higher wind loads, etc.

It may be helpful to attach the reinforcement members and the outer shell to the heatsink base of the fixture of the luminaire to provide a robust enough connection between the fixture and the visor in various embodiments of the present disclosure. In some embodiments of the present disclosure, the wall thickness of the reinforcement member and the outer panel in total is increased to about 0.080 (+/−0.005") of an inch locally, increasing the stiffness by about 8 times. In other embodiments of the present disclosure, the total wall thickness is increased to about 0.100 of an inch, increasing the stiffness by about 15.0 to about 16.0 times.

Various examples of the disclosure have been described. Any combination of the described systems, operations, or functions is contemplated. These and other examples are within the scope of the following claims.

What is claimed is:

1. A reinforced visor for use with a luminaire, the visor comprising:

a reinforcement system including a first rib bracket with a first m-shape, a second rib bracket with a second m-shape, and a first reinforcement member that is attached to the first rib bracket;

wherein the first reinforcement member is a top plate that is attached to a top flange of the first rib bracket that includes a trapezoidal shape with a short side, and a long side, a first plurality of apertures forming a first linear array adjacent the short side, and a second plurality of apertures forming a second linear array adjacent the long side.

2. The visor of claim 1, wherein the reinforcement system includes a second reinforcement member that is attached to the first rib bracket and that is also attached to the second rib bracket.

3. The visor of claim 2, wherein the second reinforcement member is a first side plate.

4. The visor of claim 3, wherein the reinforcement system further includes a second side plate that is attached to the first rib bracket and the second rib bracket, and the first side plate, the second side plate form a first pair of parallel sides of a reinforcement frame, and the first rib bracket, and the second rib bracket define a second pair of parallel sides of the reinforcement frame.

5. The visor of claim 1, wherein the first plurality of apertures includes three or four apertures with fasteners disposed therein, and the second plurality of apertures includes four empty holes.

6. The visor of claim 1, wherein the top plate defines an overall length, an overall width, and a ratio of the overall length to the overall width ranges from 5.15 to 7.4, or from 2.95 to 4.25.

7. The visor of claim 1, wherein the visor defines a visor length, and a ratio of the visor length to the first predetermined distance ranges from 1.75 to 2.5.

8. A reinforced visor for use with a luminaire, the visor comprising:

an exterior shell;

a first interior end rib bracket; and at least a first exterior reinforcement member;

wherein the exterior shell extends an overhang distance measured from the first interior rib bracket to a free end of the exterior shell, and the at least first exterior reinforcement member is attached to the first interior rib member with the exterior shell interposed between the at least first exterior reinforcement member and the first interior end rib bracket.

9. The visor of claim 8, wherein the at least first exterior reinforcement member is a top exterior plate that extends adjacent the free end of the exterior shell and includes a plurality of mounting apertures disposed adjacent the free end.

10. The visor of claim 8, wherein the at least first exterior reinforcement member is a first exterior side plate that extends adjacent the free end of the exterior shell and includes a plurality of mounting apertures disposed adjacent the free end.

11. The visor of claim 10, further comprising a second exterior side plate opposite of the first exterior side plate that extends adjacent the free end of the exterior shell and includes a plurality of mounting apertures.

12. The visor of claim 10, wherein the first exterior side plate is also attached to a second interior rib bracket with the outer shell interposed between the second interior rib bracket and the first exterior side plate.

13. The visor of claim 11, wherein the second exterior side plate is also attached to a second interior rib bracket with the outer shell interposed between the second interior rib bracket and the second exterior side plate.

14. The visor of claim 8, wherein a wall thickness of the reinforcement member and the outer panel in total ranges from 0.080 of an inch to 0.120 of an inch.

* * * * *